(12) United States Patent
Barahona

(10) Patent No.: US 6,500,478 B2
(45) Date of Patent: Dec. 31, 2002

(54) CORN COFFEE

(76) Inventor: Nancy Barahona, 90-11 149th St., Apt. 61, Jamaica, NY (US) 11435

( * ) Notice: Subject to any disclaimer, the term of this patent is extended or adjusted under 35 U.S.C. 154(b) by 0 days.

(21) Appl. No.: 09/826,140

(22) Filed: Apr. 4, 2001

(65) Prior Publication Data

US 2001/0026830 A1 Oct. 4, 2001

Related U.S. Application Data

(60) Provisional application No. 60/194,667, filed on Apr. 4, 2000.

(51) Int. Cl.[7] ............... A23F 5/44; A23F 5/00; A23L 2/38

(52) U.S. Cl. ............... 426/596; 426/590; 426/598

(58) Field of Search ............... 426/590, 594, 426/598, 596

(56) References Cited

U.S. PATENT DOCUMENTS

| | | | | |
|---|---|---|---|---|
| 3,846,397 | A | * 11/1974 | Ernster | |
| 4,072,765 | A | 2/1978 | Scarsella et al. | |
| 4,187,324 | A | 2/1980 | Shirbroun | |
| 4,188,409 | A | 2/1980 | Kay | |
| 5,153,019 | A | * 10/1992 | Hammond | |
| 5,387,425 | A | * 2/1995 | Hsu et al. | |
| 6,020,016 | A | * 2/2000 | Castleberry | |
| 6,171,635 | B1 | 1/2001 | Zhao | |

OTHER PUBLICATIONS

United States Statutory Invention Registration No. H673, published Sep. 5, 1989.
"Coffee Alternatives", *Abundant Earth*, 1999–2000, http://www.abundantearth.com/store/notcoffee1.html (Dec. 13, 1999).
"Coffee Substitute", *Spice Discounters*, http://www.napa-net.net/~spice/coffsub.html1 (Dec. 13, 1999).
"Trying to drink less coffee?", *1001 herbs For A Healthy Life*, 1998, http://www.1001herbs.com/herbal–beverage (Dec. 13, 1999).
"A good coffee substitute?", *Nutritionist: SPECIFIC FOODS*, 1996–1999, http://www.parentsplace.com/expert/nutritionist/specificfoods/qa/0,3488,12954,00.html1 (Dec. 13, 1999).
"Two Coffee Substitutes From Plants Around Us", *Foods, Recipes, Cooking Tips, www. makestuff.com* (Dec. 6, 1999).
"Does It Contain Any Caffeine?", *Yerbamate' and the Xanthine Alkaloids*, http://www.healthfree.com/herbgarden/yer-baxan.htm (Dec. 13, 1999).
"Two Coffee Substitutes From Plants Around Us?", http://www.icemall.com/reports/household/24.html (Dec. 13, 1999).

* cited by examiner

*Primary Examiner*—Anthony J. Weier
(74) *Attorney, Agent, or Firm*—Scully, Scott, Murphy & Presser

(57) ABSTRACT

The present invention is directed to a non-caffeine containing brewable coffee containing (a) white corn, (b) allspice pepper or cloves or mixture thereof and (c) cinnamon or vanilla or mixture thereof.

25 Claims, No Drawings

CORN COFFEE

CROSS REFERENCE TO RELATED APPLICATION

The present application is claiming the benefit of U.S. Provisional Application Ser. No. 60/194,667, filed on Apr. 4, 2000.

FIELD OF THE INVENTION

The present invention relates to a coffee-substitute and more particularly, to a coffee-substitute produced from white corn.

BACKGROUND OF THE INVENTION

Hot coffee beverages are widely consumed throughout the world and are generally prepared from roasted coffee. Many consumers enjoy the taste and/or aroma of roasted coffee. In addition, many consumers believe that the consumption of coffee reduces stress during the workday.

The U.S. consumes about 70% of the world's coffee crop or about 3 cups a day for each American. Coffee beverages contain about 100 mg caffeine per cup (per 8 ounces).

Unfortunately, caffeine has many adverse side effects. Caffeine stimulates the nervous system. Excessive amounts of caffeine can make people tense, irritable, and unable to sleep. It also increases diuresis and dilates the vascular system. In some cases, it elevates the heart rate to unsafe levels. Caffeine can also irritate the alimental canal. It is common for people diagnosed with sensitive stomachs, colons and the like to be required, as part of their medical treatment, to refrain from ingesting caffeine. Moreover, caffeine can penetrate the placenta and is possibly linked to birth defects.

As a result of the health problems associated with the ingestion of excessive caffeine, such as those enumerated hereinabove, in 1980, the Food and Drug Administration has removed caffeine from its Generally Recognized As SAFE (GRAS) list to an interim list. In view of the health concerns related to the ingestion of excessive amounts of caffeine, to avoid excessive consumption of caffeine, many consumers began drinking decaffeinated coffee or beverages prepared from coffee substitutes.

Coffee substitutes have been prepared from various starch materials. For example in U.S. Pat. No. 4,137,324 to Shirbroun, green soybeans are used to make coffee substitutes. More specifically, green soy beans are defatted, preferably by crushing, prior to grinding and roasting. In one embodiment, the green soybeans are presoaked prior to crushing and defatting. Thereafter, the crushed, defatted soybeans are dried at 250° F. to 350° F. to a moisture content of from 11 to 13 wt %. The dried soybeans are then ground and roasted. Shirbroun prefers slow roasting, preferably at 350° F. to 325° F. for up to 45 minutes, until the product has the appearance of ground coffee.

While consumers describe the brewed product prepared in accordance with the method of Shirbroun as having the appearance and taste of coffee, they also noted some soy aroma. To many coffee drinkers aroma is essential to the enjoyment of coffee. Accordingly, the coffee thus prepared is not entirely satisfactory to all coffee drinkers.

Moreover, consumers who enjoy the taste imparted by beverages prepared from caffeinated coffee found the taste of decaffeinated coffee or other coffee substitutes unsatisfactory. A great majority of consumers are unable to accept those products as a substitute for caffeinated regular coffee due to their somewhat inferior taste, aroma, and flavor. Many consumers thus avoid drinking non-caffeinated coffee or coffee substitutes for this reason and have continued to drink regular caffeinated coffee.

Nevertheless, a large number of consumers are desirous of obtaining a product containing significantly lower amounts of caffeine than in pure coffee products, provided the product could yield a brewed beverage closely resembling brewed coffee in taste, flavor and aroma. Unfortunately, to date, no such product has been satisfactory.

The present inventor has found such a product. It has the taste, aroma and appearance of caffeinated coffee, but it is not coffee. In fact, it does not contain any caffeine, and thus avoids the health problems associated with caffeinated coffee.

SUMMARY OF THE INVENTION

The present invention is directed to a coffee-like product, the composition of which contains white corn, a first component selected from the group consisting of whole allspice pepper and whole cloves or combination thereof, and a second component selected from the group consisting of cinnamon and vanilla or combination thereof, said first and second components and corn being roasted together and ground, said white corn being present as the major component, and the first and second components being present together in amounts sufficient to mask the corn flavor and to impart a coffee-like aroma thereto.

DETAILED DESCRIPTION OF THE PREFERRED EMBODIMENTS

The present invention is directed to a coffee-substitute comprised of white corn, allspice pepper or cloves or combination thereof and cinnamon or vanilla or combination thereof.

The major component of the coffee-like composition of the present invention is white corn, which is usually the whole ground or stone-ground corn. Of all of the corn products, the present inventor has found that white corn is the most preferable. The white corn product used in the present composition is commercially available. The white corn should be a relatively dry solid. It should be removed from the stalk, which is effected by conventional methods. The whole kernel is used, which may be obtained commercially or from white corn on the cob and the kernel removed by conventional means. In addition, in lieu of the grain and whole kernel corn, a ground product may be utilized or a combination of any of the aforementioned forms. In fact, the present inventor has found that the white corn commercially available could be used as is to make the present coffee-like product by the present process, i.e., no further treatments are required.

The present inventor has found that a product prepared from the white corn itself, without any additional ingredients, is totally unsatisfactory. It had a very strong bitter taste. It did not possess the flavor, aroma or taste of coffee.

To mask the bitter taste and to impart the coffee flavor thereto, the present inventor added additional components thereto.

The first component added thereto is whole allspice pepper, or whole cloves or a combination thereof.

Allspice pepper is the dried, unripe berries of a shiny leafed evergreen tree indigenous to the western hemisphere. The berries are reddish brown, round and smooth and about 1 cm in diameter. The flavor thereof has been described as a combination of spices, viz., cloves, cinnamon and nutmeg. It is commercially available and is sold as a relatively dry solid. The commercial product can be used "as is" without further treatment.

Cloves are the dried unopened flower buds of an evergreen tree of the myrtle family. Cloves are 1–1.25 um long and resemble a rounded top nail. It has a strong and aromatic flavor. It is commercially available. It is commercially sold as a relatively dry product. Whole cloves can be used "as is" without further treatment.

The preferred first component is whole allspice pepper.

The second component is cinnamon, or vanilla or combination thereof.

Cinnamon, as used herein is either Cassia (species *Cinnamomum cassia*) or the species *Cinnamomum zeylanicum*. True cinnamon, from the latter species, has a pale color and has a very mild delicate flavor. Cassia, which is what is generally imported into the United States and which is generally sold in supermarkets, is darker red with a much stronger flavor. Both come from the bark of evergreen trees, which is peeled off and allowed to curl into cinnamon sticks. It is preferred that the cinnamon used in the process of the present invention is cassia. In addition, it is preferred that the cinnamon used in the present process is in the form of a stick. The cinnamon should be relatively dry. The cinnamon is commercially available in the United States and can be used as commercially sold, without further treatment.

Vanilla, as used herein, is the common term for the alcoholic extract of the vanilla bean, which is the fruit of a thick tropical vanilla orchid vine. The vanilla that is useful in the present invention is the extract that has been cured by techniques known in the art, which includes the following well known steps: (1) wetting or killing of the vanilla bean; (2) sweating the wetted beans; (3) drying the sweated beans; and (4) conditioning of the dried bean in closed containers, e.g., boxes, where they finish developing their fragrance. Vanilla extract is commercially available. The vanilla that is useful in the present invention is a solid and relatively dry. It is commercially available in the United States and can be used as is without further treatment.

It is preferred that the second component is cinnamon (especially cassia), especially in the form of a cinnamon stick.

All of the components used to make the coffee-like product of the present invention must be in solid form; liquids cannot be used in the present process, since it is critical that the components are ground to make the coffee-like product of the present invention. Moreover, they must be substantially dry. Preferably, the amount of moisture present in each of the individual ingredients is no greater than that which is commercially sold.

Of all of the components, the white corn is present in the coffee-like product of the present invention in the greatest amount. It is present in greater than 50% by weight of the coffee-like product of the present invention and more preferably greater than about 65% by weight of the product.

As indicated hereinabove, the first and second components are present in sufficient concentrations such that when roasted and ground with the white corn they mask the bitter flavor of the corn and impart the coffee aroma, taste and appearance thereto. Moreover, the second component is present by weight in amounts greater than the first component. More preferably, the second and first components are present in a weight ratio ranging from about 1:1 to about 5:1 and even more preferably from about 1.25:1 to about 3:1 and most preferably at about 15:1, respectively.

The weight ratio of the white corn to the first component preferably ranges from about 16:1 to about 75:1 and more preferably from about 18:1 to about 28:1 and most preferably at about 23.5:1. In addition, the weight ratio of the white corn to the second component preferably ranges from about 8:1 to about 60:1 and more preferably about 10:1 to about 25:1 and most preferably at about 16:1.

In a preferred embodiment, the white corn is present in an amount ranging from about 65% by weight to about 97% by weight, more preferably from about 75% to about 95% by weight and most preferably from about 85% to about 93% by weight of the composition of the coffee-like product of the present invention.

In a preferred embodiment, the first component is present in an amount ranging from about 1% to about 6% by weight and more preferably from about 3% to about 5% by weight of the composition of the coffee-like product of the present invention.

It is furthermore preferred that the second component is present in an amount ranging from about 1.0% to about 8% by weight and more preferably from about 1.5% to about 8% by weight and even more preferably from about 3.5% to about 7% by weight of the composition of the coffee-like product of the present invention, however the second component is present in greater amounts than the first component.

It is especially preferred that the white corn is present in the coffee like composition of the present invention in an amount ranging from about 75% to about 95%, the first component is present in an amount ranging from about 1% to about 6% and the second component is present from about 1% to about 8% by weight, with the second component being present in greater amounts than the first component. More preferably, the white corn is present in an amount ranging from about 85% to about 93% by weight, the first component in an amount ranging from about 3% to about 5% by weight and the second component in an amount ranging from about 3.5% to about 7% by weight of the composition of the coffee-like product of the present invention, with the second component being present in greater amounts than the first component. It is to be noted that the sum of all of the percentages cannot be greater than 100%.

In addition to the above three components, the coffee-like composition of the present invention may contain adjuvants normally added to make coffee like products. They also must be solid and be relatively dry. Examples include cocoa, rye and nuts, including cashews and almonds and the like or combination thereof. If a nut is utilized, the nut is preferably deshelled. These components are also commercially available and can be used as is without further treatment or purification. If adjuvants are present, they are present in an amount up to about 5% by weight of the coffee-like composition of the present invention.

The coffee-like product of the present invention is prepared from standard techniques known to one of ordinary skill in the art. For example, the white corn, the first component, and the second component and optionally the adjuvants are mixed together, roasted and ground using standard techniques in the art. The order of the steps is not important. In other words, the ingredients can be roasted first and then ground or vice versa. However, it is preferred that the ingredients are roasted and then ground.

The ingredients are roasted in much the same manner that coffee beans are roasted. As is well known to those skilled in the art of coffee roasting processes, the roasters employed may be batch roasters, continuous roasters, or a frying pan and the like. It is preferred that the ingredients are roasted on a frying pan. It is preferred that the roasting temperatures range from about 250° F. to about 375° F. and most preferably from about 300° F. to about 350° F. Of course, the length of time will vary, depending upon the size of the batch and the like. Moreover, the roasting endpoint is often achieved by color examination. In this case the ingredients are roasted until the product has the appearance of ground coffee. However, the roasting endpoint may also be achieved by color examination as defined by a Hunter Color Scale Value. The Hunter Scale is a well known means of defining the color of a given material. A complete technical description of the system can be found in an article by R. S. Hunter, "Photoelectric Color Difference Meter", Journal of the Optical Society of America, 48, 985-95, 1958, the contents of which are incorporated herein by reference. Devices specifically designed for the measurement of color on the Hunter scales are described in U.S. Pat. No. 3,003,388 to Hunter, et al., the contents of which are incorporated herein by reference. In general, the Hunter color "L" scale values are units of light reflectance measurement, and the higher the value is, the lighter the color is since lighter colored material reflects more light. In particular, in the Hunter color system, the "L" scale contains 100 equal units of division; absolute black is at the bottom of the scale (L=0) and absolute white is at the top of the scale (L=100). Thus, in measuring Hunter Color value of the coffee-like product of the present invention, the lower the "L" scale value, the darker the product. The "L" scale value described herein are also an accurate means of defining the degree of roast necessary to produce a product which when roasted gives a product with the L scale values herein described. Determination of optimum roasting conditions is within the skill of one of knowledgeable in the field and can be determined after a few Hunter Color measurements of degrees of roast of the coffee-like product of the present invention and comparison of the roasted and ground color values associated with roasted ground and coffee color values. Of course, the Hunter Color Scales is just one means employed; many times roasting is to the point at which one of ordinary skill in the art knows the color to be correct based upon years of coffee roasting experience.

After roasting, the components are cooled to ambient temperatures.

The components are ground by conventional means known to one of ordinary skill in the art, for example, in a Grindmaster Mill or a conventional blender. The size of the grind may be determined by Tyler sieves to allow optimum extraction of flavor, aroma and color. The ingredients are ground to the conventional regular drip or find grind sizes as those terms used in the traditional sense in the coffee industry. As a guideline, the standards of the grinds as suggested in the 1940 simplified Practice Recommendation by the United States Department of Commerce are as follows: "Regular grind", 33 percent is retained on a 14 mesh Tyler Standard sieve, 55 percent is retained on a 28 mesh Tyler Standard sieve and 12 percent passes through a 28 Mesh Tyler standard sieve "drip grind"; 7 percent retained on a 14 Mesh Tyler Standard sieve and 27 percent passes through a 28 Mesh Tyler Standard sieve; and "fine grind", 100 percent passes through a 14 mesh Tyler sieve and 30 percent passes through a 28 Tyler Standard sieve.

After the ground and roast product is prepared as described herein, it may be packaged in the same manner as roast and ground coffee in vacuum cans and shipped for sale. Alternatively it may be stored in an air tight containers. Once stored, it can be used indefinitely; its shelf life being a year or more. The coffee prepared in accordance with the present invention can also be stored in a refrigerator to preserve the delightful smell.

The novel product of the present invention can be brewed like conventional roast and ground coffee. It looks like roast and ground coffee. The particles flow like particles of roast and ground coffee. The product can be brewed for preparation of coffee-like beverages in the fashion of "drip coffee", "percolated coffee", for coffee brewing machines employing a coffee packet and filter or placed in a coffee strainer or filter and steeped, or the like. For example, brewing of the beverage of this invention by conventional percolation means is just exactly the same as brewing conventional roast and ground coffee. The ground and roasted product of the present invention is placed, using typical measurements, in a conventional coffee percolator, and the brew is perked with the result being a clear brown beverage. The product thus produced has the typical coffee appearance, taste and smell.

The more coffee-like product of the present invention used in brewing, the stronger the coffee taste, while the less coffee like product used, the weaker the coffee taste, just like with regular coffee. The coffee product of the present invention can be drunk cold or hot. It may be drunk plain, sweetened and/or with milk or cream.

The present coffee-like product of the present invention has the advantages over regular coffee in that it lacks caffeine and thus consumers ingesting the same do not suffer from the health problems associated therewith. It has a nutritional profile better than that of regular coffee. Moreover, it has the color and appearance, taste and aroma of coffee. Thus, not only does the product of the present invention appeal to consumers interested in health foods and concerned about caffeine, but it also appeals to the regular coffee drinkers as well.

As used herein, unless indicated to the contrary, percentages are by dry weight.

Moreover, the plural signifies the singular and vice-versa.

The following non-limiting example further illustrates the present invention.

EXAMPLE 47 g (1 cup) of dry white corn, 2 g of whole allspice pepper and 3 g of cinnamon (2 sticks) are mixed together and placed in a frying pan and roasted until the white corn becomes dark brown and brittle, at a temperature of about 300° F. to about 350° F. for about 30 to about 45 minutes. Once the ingredients are roasted, they are then ground. The coffee then prepared can be used as is or stored.

To make a brewed cup of coffee, 1 cup of water was boiled. A tablespoon of the product of the present invention was poured inside a coffee strainer. The coffee strainer containing the coffee product thus prepared was steeped in the hot water until the coffee product disappears.

Alternatively, the coffee product can be brewed in a coffee maker.

This amount makes about 20 cups of coffee.

While specific embodiments of the present invention have been disclosed in the foregoing description, it will be understood that various modifications within the scope of the invention may occur to those skilled in the art. Therefore, it is intended that adaptations and modifications should and are intended to be comprehended within the meaning and range of equivalents of the disclosed embodiments.

What is claimed is:

1. A brewable coffee-like product which does not contain caffeine and which is comprised of the following ingredients: white corn, a first component selected from the group consisting of whole allspice pepper and whole cloves or mixture thereof, and a second component selected from the group, consisting of cinnamon and vanilla or mixture thereof, said ingredients being in a solid form and substantially dry, comminuted and roasted, wherein the weight ratio of white corn to the first component ranges from about 16:1 to about 75:1, the weight ratio of the white corn to the second component ranges from about 8:1 to about 60:1 and the weight ratio of the second component to the first component ranges from about 1:1 to about 5:1, wherein the second component is present in greater amounts than the first component.

2. The coffee-like product according to claim 1 wherein the weight ratio of the second component to the first component ranges from about 1.25:1 to about 3:1.

3. The coffee-like product according to claim 2 wherein the weight ratio is about 1.5:1.

4. The coffee-like product according to claim 1 in which the weight ratio of white corn to the first component ranges from about 18:1 to about 28:1.

5. The coffee-like product according to claim 4 wherein the weight ratio of white corn to the first component is about 23.5:1.

6. The coffee-like product of claim 1 wherein the weight ratio of white corn to the second component ranges from about 10:1 to about 25:1.

7. The coffee-like product of claim 6 wherein the weight ratio of white corn to the second component is about 16:1.

8. The coffee-like product of claim 1 wherein the first component is whole allspice pepper.

9. The coffee-like product of claim 1 wherein the second component is cinnamon.

10. The coffee-like product of claim 1 wherein the first component is whole allspice pepper and the second component is cinnamon.

11. The coffee-like product of claim 1 wherein the cinnamon is present in the form of a cinnamon stick.

12. A process for preparing a brewable coffee type product comprising roasting and comminuting a mixture comprising white corn, a first component selected from the group consisting of whole allspice pepper and whole cloves or combination thereof and a second component selected from the group consisting of cinnamon and vanilla or combination thereof, wherein the white corn, first component and the second component are substantially dry solids and wherein the weight ratio of white corn to the first component ranges from about 16:1 to about 75:1, the weight ratio of the white corn to the second component ranges from about 8:1 to about 60:1 and the weight ratio of the second component to the first component ranges from about 1:1 to about 5:1, said second component being present in greater amounts than the first component.

13. The process according to claim 12 wherein the first component is whole allspice pepper.

14. The process according to claim 12 wherein the second component is cinnamon.

15. The process according to claim 12 wherein the first component is whole allspice pepper and the second component is cinnamon.

16. The process according to claim 12 wherein the cinnamon is present in the form of a cinnamon stick.

17. A brewable coffee like product having the aroma and appearance of coffee in the absence of caffeine comprised of white corn, a first component selected from the group consisting of whole allspice pepper and whole cloves or mixture thereof and a second component selected from the group consisting of cinnamon and vanilla or mixture thereof.

18. The brewable coffee-like product of claim 17 wherein the first component is whole allspice pepper.

19. The brewable coffee-like product of claim 17 wherein the second component is cinnamon.

20. The brewable coffee-like product of claim 17 wherein the first component is allspice pepper and the second component is cinnamon.

21. The brewable coffee-like product of claim 17 wherein the cinnamon is present in the form of a cinnamon stick.

22. The brewable coffee-like product of claim 17 wherein the white corn is present in at least about 75% by weight of the product and the second component is present in amounts greater than the first component.

23. The brewable coffee-like product of claim 22 wherein the white corn is present in amounts greater than about 85% by weight of the product.

24. The brewed product of claim 12.

25. The coffee-like product of claim 1 which is additionally brewed.

* * * * *